(12) United States Patent
Sekiya

(10) Patent No.: US 8,746,814 B2
(45) Date of Patent: Jun. 10, 2014

(54) VEHICLE BRAKE FLUID PRESSURE CONTROL APPARATUS

(71) Applicant: Nissin Kogyo Co., Ltd., Ueda (JP)

(72) Inventor: Tomoaki Sekiya, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 3 days.

(21) Appl. No.: 13/627,070

(22) Filed: Sep. 26, 2012

(65) Prior Publication Data

US 2013/0076117 A1    Mar. 28, 2013

(30) Foreign Application Priority Data

Sep. 28, 2011 (JP) ................................. 2011-213083
Sep. 28, 2011 (JP) ................................. 2011-213085

(51) Int. Cl.
*B60T 8/62* (2006.01)

(52) U.S. Cl.
USPC ........................................................... 303/155

(58) Field of Classification Search
USPC .................. 303/186, 187, 155; 701/72, 78
See application file for complete search history.

(56) References Cited

U.S. PATENT DOCUMENTS

| | | | |
|---|---|---|---|
| 5,944,394 A | 8/1999 | Friederichs et al. | |
| 6,880,900 B2 | 4/2005 | Hara et al. | |
| 6,968,920 B2 | 11/2005 | Barton et al. | |
| 7,481,500 B2 | 1/2009 | Miyazaki et al. | |
| 8,100,482 B2 | 1/2012 | Kito et al. | |
| 8,342,616 B2 * | 1/2013 | Sawada | 303/113.2 |
| 2007/0029875 A1 * | 2/2007 | Kurosaki et al. | 303/187 |
| 2009/0095551 A1 | 4/2009 | Sawada et al. | |
| 2010/0270855 A1 * | 10/2010 | Sawada | 303/113.2 |
| 2013/0076116 A1 * | 3/2013 | Sekiya | 303/149 |
| 2013/0184955 A1 * | 7/2013 | Kobayashi et al. | 701/72 |
| 2013/0184956 A1 * | 7/2013 | Hirose | 701/73 |

FOREIGN PATENT DOCUMENTS

| | | |
|---|---|---|
| DE | 10 2008 042534 A1 | 4/2009 |
| EP | 0 776 806 A2 | 6/1997 |
| JP | H03-246152 A | 11/1991 |
| JP | 2001-163202 A | 6/2001 |

(Continued)

OTHER PUBLICATIONS

Office Action issued in co-pending U.S. Appl. No. 13/627,035 dated Mar. 7, 2014.

*Primary Examiner* — Christopher Schwartz
(74) *Attorney, Agent, or Firm* — Carrier Blackman & Associates, P.C.; William D. Blackman; Joseph P. Carrier

(57) ABSTRACT

A vehicle brake fluid pressure control apparatus controls operations of a fluid pressure adjusting unit capable of performing adjustment of individually increasing and decreasing brake fluid pressures acting respectively on wheel brakes for front wheels and wheel brakes for rear wheels to be within allowable differential pressures allowable between the brake fluid pressures of the wheel brakes for the left and right coaxial front wheels and the left and right coaxial rear wheels. In the apparatus, a fluid pressure acquiring device acquires a lock fluid pressure of a wheel brake of a wheel coaxial with a wheel being a control target, the lock fluid pressure being a fluid pressure at which pressure decrease by an anti-lock brake control is started. An allowable differential pressure setting device sets the allowable differential pressures matching a road surface friction coefficient on the basis of at least the lock fluid pressure obtained by the fluid pressure acquiring device. The allowable differential pressures stably matching a friction coefficient of a road surface can be thereby obtained.

12 Claims, 10 Drawing Sheets

(56) References Cited

FOREIGN PATENT DOCUMENTS

| JP | 2002-356155 A | 12/2002 |
| JP | 2007-055583 A | 3/2007 |
| JP | 2008-001118 A | 1/2008 |
| JP | 2010-254029 A | 11/2010 |
| JP | 2011-079465 A | 4/2011 |
| WO | 02/074638 A1 | 9/2002 |

* cited by examiner

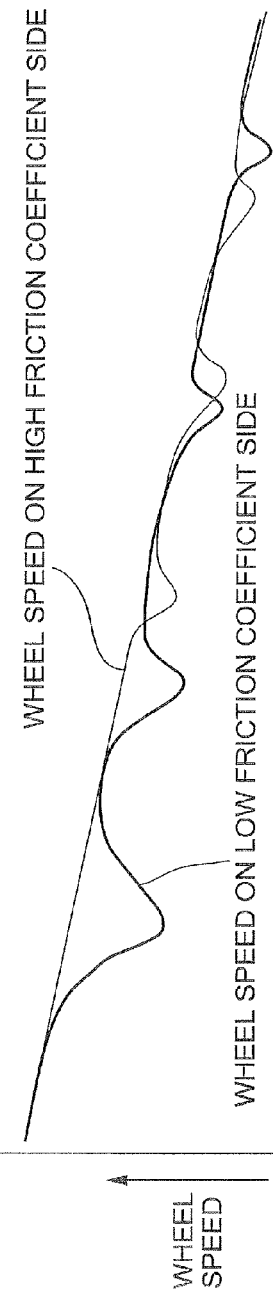
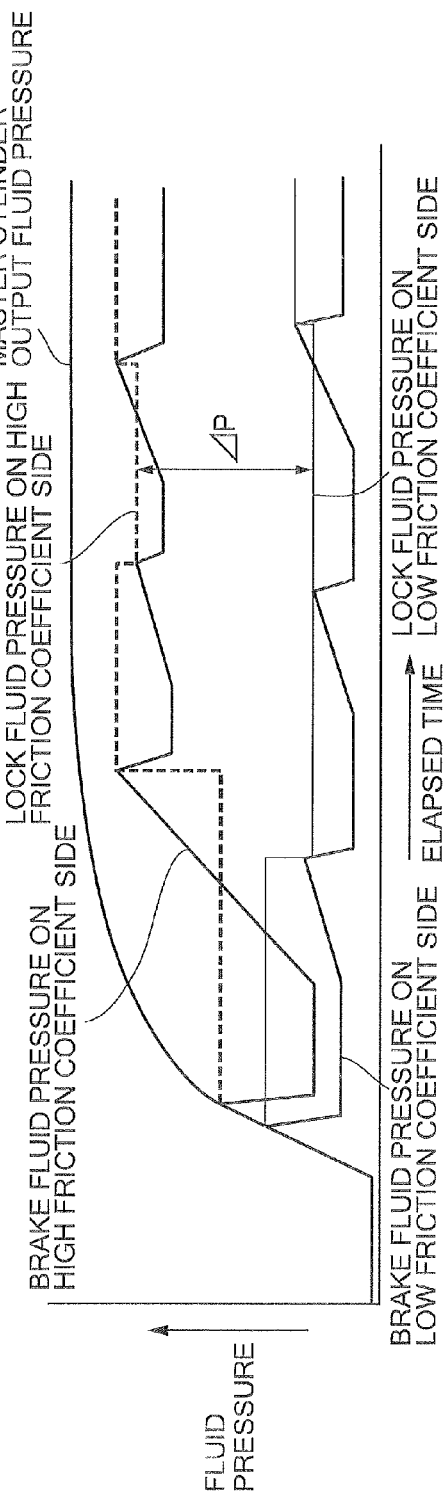

VEHICLE BRAKE FLUID PRESSURE CONTROL APPARATUS

BACKGROUND OF THE INVENTION

1. Field of the Invention

The present invention relates to a vehicle brake fluid pressure control apparatus including: a fluid pressure adjusting unit capable of performing adjustment of individually increasing and decreasing brake fluid pressures acting respectively on wheel brakes for front wheels and wheel brakes for rear wheels so as to prevent the front wheels and the rear wheels from being locked during braking; and allowable differential pressure setting means for setting allowable differential pressures allowable between the brake fluid pressures of the wheel brakes for the left and right coaxial front wheels and between the brake fluid pressures of the wheel brakes for the left and right coaxial rear wheels, the operation of the fluid pressure adjusting unit being controlled in such a way that each of the differential pressures between the brake fluid pressures of the wheel brakes for the left and right coaxial front wheels and between the brake fluid pressures of the wheel brakes for the left and right coaxial rear wheels is equal to or lower than a corresponding one of the allowable differential pressures set by the allowable differential pressure setting means.

2. Description of the Related Art

A vehicle brake fluid pressure control apparatus configured to perform anti-lock brake control independently for wheel brakes for left and right coaxial front wheels and left and right coaxial rear wheels is known from Japanese Patent Application Laid-open No. 2007-55583. In this apparatus, an allowable differential pressure selected from allowable differential pressures calculated from a vehicle speed, a lateral acceleration, and fluid pressures of the wheel brakes of the coaxial wheels is set by allowable differential pressure setting means, and a differential pressure larger than the selected differential pressure is prevented from occurring between the brake fluid pressures of the left and right wheel brakes.

In the apparatus disclosed in Japanese Patent Application Laid-open No. 2007-55583 described above, when each allowable differential pressure is set, the fluid pressure of the wheel brake of the coaxial wheel is used as a component corresponding to the friction coefficient of the road surface. In this configuration, there is a case where hunting caused by the effects of fluid pressure change due to increase and decrease in the brake fluid pressure in the anti-lock brake control occurs and stable allowable differential pressures cannot be obtained.

SUMMARY OF THE INVENTION

The present invention has been made in view of the circumstances described above and an object thereof is to provide a vehicle brake fluid pressure control apparatus capable of obtaining an allowable differential pressure stably matching a friction coefficient of a road surface.

In order to achieve the object, according to a first feature of the present invention, there is provided a vehicle brake fluid pressure control apparatus including: a fluid pressure adjusting unit capable of performing adjustment of individually increasing and decreasing brake fluid pressures acting respectively on wheel brakes for front wheels and wheel brakes for rear wheels so as to prevent the front wheels and the rear wheels from being locked during braking; and allowable differential pressure setting means for setting allowable differential pressures allowable between the brake fluid pressures of the wheel brakes for the left and right coaxial front wheels and between the brake fluid pressures of the wheel brakes for the left and right coaxial rear wheels, the operation of the fluid pressure adjusting unit being controlled in such a way that each of the differential pressures between the brake fluid pressures of the wheel brakes for the left and right coaxial front wheels and between the brake fluid pressures of the wheel brakes for the left and right coaxial rear wheels is equal to or lower than a corresponding one of the allowable differential pressures set by the allowable differential pressure setting means, wherein the vehicle brake fluid pressure control apparatus comprises fluid pressure acquiring means for acquiring a lock fluid pressure of a wheel brake of a wheel coaxial with and other than a wheel being a control target, the lock fluid pressure being a fluid pressure at which pressure decrease by an anti-lock brake control is started, and the allowable differential pressure setting means sets the allowable differential pressures matching a road surface friction coefficient on the basis of at least the lock fluid pressure obtained by the fluid pressure acquiring means.

According to the configuration of the first feature described above, each allowable differential pressure matching the road surface friction coefficient is set based on at least the lock fluid pressure of the wheel brake of the wheel coaxial with and other than the wheel being the control target, the lock fluid pressure being the fluid pressure at which pressure decrease by an anti-lock brake control is started. Accordingly, compared to the conventional case in which the fluid pressure of the wheel brake of the coaxial wheel is used as a component corresponding to the friction coefficient of the road surface, it is possible to suppress fluctuation in the allowable differential pressure in such a way that hunting caused by the effects of fluid pressure change due to increase and decrease in the brake fluid pressure in the anti-lock brake control is prevented from occurring. Hence, the allowable differential pressures stably matching the friction coefficient of the road surface can be set.

Further, according to a second feature of the present invention, in addition to the configuration of the first feature, the fluid pressure acquiring means calculates the lock fluid pressure on the basis of an output fluid pressure of a master cylinder common to the wheel brakes and drive electric currents of electromagnetic valves forming part of the fluid pressure adjusting unit. In such a configuration, the lock fluid pressure can be appropriately acquired without using sensors or the like.

According to a third feature of the present invention, in addition to the configuration of the first or second feature, the allowable differential pressure setting means has a map in which the allowable differential pressures are set in advance for the lock fluid pressure and sets the allowable differential pressures matching the road surface friction coefficient on the basis of the map. In such a configuration, each allowable differential pressure can be easily set to a value suitable for the friction coefficient of the road surface by using the map set based on experiments, simulations, and the like.

According to a fourth feature of the present invention, in addition to the configuration of the first feature, fluid pressure acquiring means is capable of acquiring the fluid pressure of the wheel brake of the wheel coaxial with and other than the wheel being the control target, and the allowable differential pressure setting means sets each of the allowable differential pressures matching the road surface friction coefficient on the basis of the larger one of the fluid pressure of the wheel other than the wheel being the control target and the lock fluid pressure acquired by the fluid pressure acquiring means. In such a configuration, even when the brake fluid pressure is increased, this increase can be immediately reflected in the setting of the allowable differential pressures. Hence, the allowable differential pressures matching the road surface friction coefficient can be set more accurately.

According to a fifth feature of the present invention, in addition to the configuration of the first feature, the allowable differential pressure setting means sets the allowable differential pressures based on the lock fluid pressure in a period except for a period from a start of pressure decrease in a start of the anti-lock brake control to a start of pressure increase. In such a configuration, the allowable differential pressure matching the road surface friction coefficient is not set in the period from the start of pressure decrease in the start of the anti-lock brake control to the start of pressure increase. The allowable differential pressures based on the lock fluid pressure are thus not set in a period in which the lock fluid pressure may overshoot due to full braking. Accordingly, the reliability can be improved.

According to a sixth feature of the present invention, in addition to the configuration of the first feature, the apparatus further comprises estimated vehicle body deceleration calculating means for calculating an estimated vehicle body deceleration, wherein the allowable differential pressure setting means sets a value of the larger one of the allowable differential pressure set based on the estimated vehicle body deceleration and the allowable differential pressure set based on the lock fluid pressure as each of the allowable differential pressures matching the road surface friction coefficient. In such a configuration, the allowable differential pressures are set in consideration of the estimated vehicle body deceleration as a component corresponding to the friction coefficient of the road surface. Accordingly, the allowable differential pressures more accurately matching the friction coefficient of the running road surface can be obtained.

According to a seventh feature of the present invention, in addition to the configuration of the sixth feature, the apparatus comprises: split road judging means for judging whether a road is a split road in which fiction coefficients of contact road surfaces of left and right wheels differ greatly from each other; and low-friction coefficient road judging means for judging whether a road is a low-friction coefficient road in which a friction coefficient of a road surface is lower than a predetermined friction coefficient, wherein application of the allowable differential pressures matching the road surface friction coefficient is prohibited when a judgment result of the split road judging means is the split road or when a judgment result of the low-friction coefficient road judging means is the low-friction coefficient road. In such a configuration, when the vehicle is running on a road surface which is not the split road or the low-friction coefficient road and the running state of the vehicle is stable, the allowable differential pressures matching the road surface friction coefficient are applied to the wheel brake fluid pressures of the coaxial front wheels and the coaxial rear wheels and the appropriate allowable differential pressures matching the road surface state can be thereby applied.

According to an eighth feature of the present invention, in addition to the configuration of the seventh feature, the apparatus further comprises estimated vehicle body deceleration calculating means for calculating an estimated vehicle body deceleration of a vehicle, wherein the allowable differential pressure setting means sets a value of the larger one of the allowable differential pressure based on the estimated vehicle body deceleration and the allowable differential pressure based on the lock fluid pressure as each of the allowable differential pressures matching the road surface friction coefficient. In such a configuration, the allowable differential pressures matching the friction coefficient of the road surface can be accurately set.

According to a ninth feature of the present invention, in addition to the configuration of the seventh or eighth feature, the split road judging means judges that the road is the split road when an independent control using the allowable differential pressure is continuously executed for a predetermined time or more in any of the wheel brakes for the left and right front wheels. In such a configuration, the road is judged as the split road when the independent control using the allowable differential pressures continues for the predetermined time or more in any of the left and right front wheels. This makes it possible to appropriately make the judgment of the split road and stop the setting of the allowable differential pressures matching the road surface friction coefficient while the vehicle is running on the split road. The vehicle behavior stability can be thereby secured.

According to a tenth feature of the present invention, in addition to the configuration of the seventh feature, the split road judging means judges that the road is the split road when the brake fluid pressure of the wheel being the control target is higher than the lock fluid pressure of the wheel brake of the wheel coaxial with and other than the wheel being the control target by a predetermined value or more. In such a configuration, the road is judged as the split road when the brake fluid pressure of the wheel being the control target is higher than the lock fluid pressure of the wheel brake of the wheel coaxial with and other than the wheel being the control target by the predetermined value or more. This makes it possible to appropriately make the judgment of the split road and stop the setting of the allowable differential pressures matching the road surface friction coefficient while the vehicle is running on the split road. The vehicle behavior stability can be thereby secured.

According to an eleventh feature of the present invention, in addition to the configuration of the seventh feature, the low-friction coefficient road judging means judges that the road is the low-friction coefficient road when a change amount of the estimated vehicle body deceleration calculated by the estimated vehicle body deceleration calculating means is lower than a defined value. In such a configuration, the road is judged as the low-friction coefficient road when the change amount of the estimated vehicle body deceleration is lower than the defined value. This make it possible to appropriately make the judgment of the low-friction coefficient road and the vehicle behavior stability can be thereby secured.

Further, according to a twelfth feature of the present invention, in addition to the configuration of the seventh feature, the apparatus further comprises μ jump judging means for judging whether it is a μ jump state in which a friction coefficient of a running road surface changes from a high friction coefficient to a lower friction coefficient side by a predetermined value or more, wherein the allowable differential pressure setting means stops setting of the allowable differential pressures matching the road surface friction coefficient when a judgment result of the μ jump judging means is the μ jump state. In such a configuration, it is possible to prevent deterioration in the vehicle behavior stability which is caused by setting the allowable differential pressures matching the road surface friction coefficient in the μ jump state.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 10A and 10B are graphs showing an example of change in wheel speeds of wheels on a split road and an example of change in brake fluid pressures of the left and right brakes, respectively.

DESCRIPTION OF THE PREFERRED EMBODIMENT

An embodiment of the present invention is described with reference to attached FIGS. 1 to 10B. First, in FIG. 1, a vehicle V includes: left and right coaxial front wheels WA and WB to which a driving force of an engine E is transmitted via a transmission T; and left and right coaxial rear wheels WC and WD. A brake pedal 11 operated by a driver is connected to a master cylinder M. Wheel brakes BA, BB, BC, and BD which operate by actions of brake fluid pressures are provided respectively in the front wheels WA and WB and the rear wheels WC and WD. The master cylinder M is connected to the wheel brakes BA to BD via a fluid pressure adjusting unit 12. The fluid pressure adjusting unit 12 is capable of performing adjustment of individually increasing and decreasing the brake fluid pressures acting on the wheel brakes BA to BD to prevent the wheels from locking during braking.

The operation of the fluid pressure adjusting unit 12 is controlled by a fluid pressure control apparatus 13. The fluid pressure control apparatus 13 receives: signals from wheel speed sensors SA, SB, SC, and SD attached respectively to the left and right front wheels WA and WB and the left and right rear wheels WC and WD; a signal from a pressure sensor SP detecting a braking pressure outputted from the master cylinder M; and a signal from a lateral acceleration sensor SL detecting a lateral acceleration acting on the vehicle V. The fluid pressure control apparatus 13 controls the operation of the fluid pressure adjusting unit 12 on the basis of the signals from the respective sensors SA to SD, SP, and SL.

Figure 1:
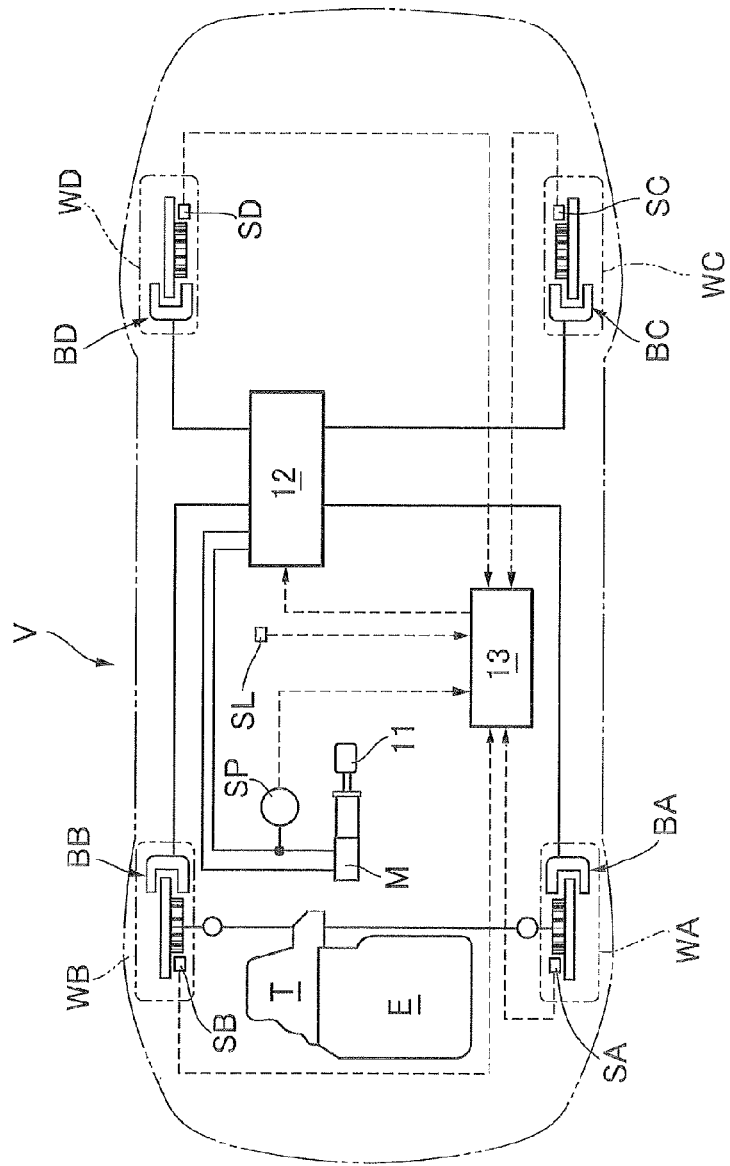
FIG. 1 is a view showing a brake fluid pressure control system of a vehicle.
Figure 2:
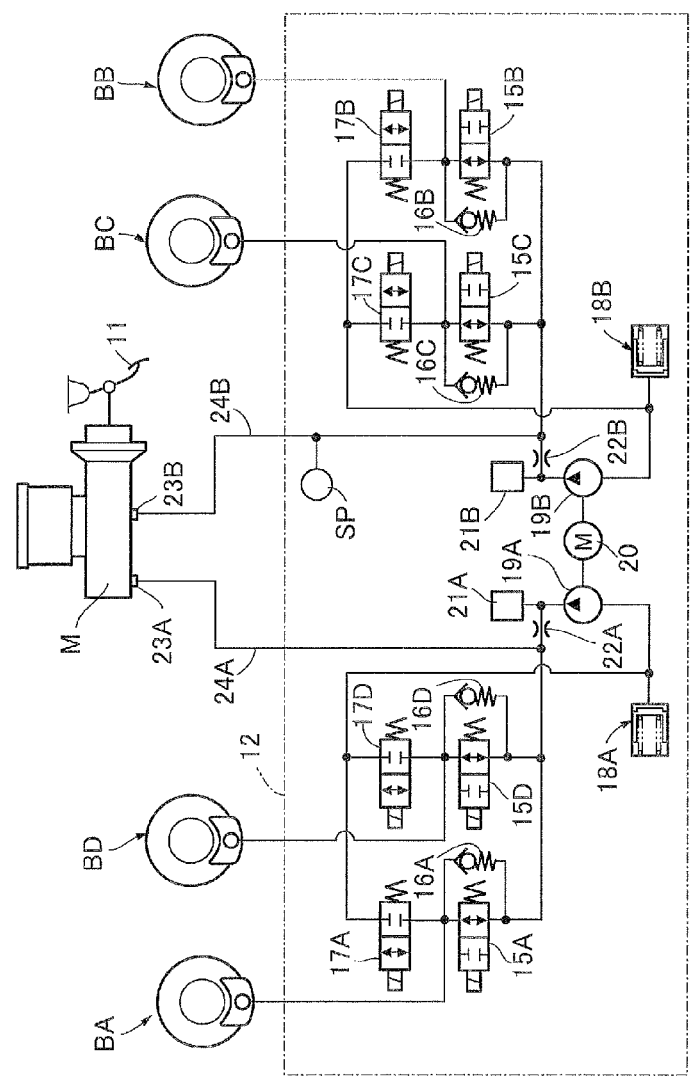
FIG. 2 is a fluid pressure circuit diagram showing a configuration of a fluid pressure adjusting unit.

In FIG. 2, the fluid pressure adjusting unit 12 includes: normally-open electromagnetic valves 15A to 15D respectively for the wheel brake BA for the left front wheel WA, the wheel brake BB for the right front wheel WB, the wheel brake BC for the left rear wheel WC, and the wheel brake BD for the right rear wheel WD; check valves 16A to 16D connected in parallel respectively with the normally-open electromagnetic valves 15A to 15D; normally-closed electromagnetic valves 17A to 17D respectively for the wheel brakes BA to BD; a first reservoir 18A for a first output fluid pressure passage 24A leading to a first output port 23A out of the first output port 23A and a second output port 23B included in the master cylinder M; a second reservoir 18B for a second output fluid pressure passage 24B leading to the second output port 23B of the master cylinder M; first and second pumps 19A and 19B whose suction sides are connected respectively to the first and second reservoirs 18A and 18B and whose discharge sides are connected respectively to the first and second output fluid pressure passages 24A and 24B; a common single electric motor 20 driving both of the pumps 19A and 19B; first and second dampers 21A and 21B to which the discharge sides of the first and second pumps 19A and 19B are connected respectively; and first and second orifices 22A and 22B each provided between the master cylinder M and a corresponding one of the dampers 21A and 21B. The pressure sensor SP is connected to one of the first and second output fluid pressure passages 24A and 24B, for example to the second output fluid pressure passage 24B.

The normally-open electromagnetic valves 15A and 15D are each provided between the first output fluid pressure passage 24A and a corresponding one of the wheel brake BA for the left front wheel WA and the wheel brake BD for the right rear wheel WD. The normally-open electromagnetic valves 15B and 15C are each provided between the second output fluid pressure passage 24B and a corresponding one of the wheel brake BB for the right front wheel WB and the wheel brake BC for the left rear wheel WC.

Moreover, the check valves 16A to 16D are connected in parallel respectively with the normally-open electromagnetic valves 15A to 15D to allow a brake fluid to flow to the master cylinder M from the wheel brakes BA to BD.

The normally-closed electromagnetic valves 17A and 17D are each provided between the first reservoir 18A and a corresponding one of the wheel brake BA for the left front wheel WA and the wheel brake BD for the right rear wheel WD. The normally-closed electromagnetic valves 17B and 17C are each provided between the second reservoir 18B and a corresponding one of the wheel brake BB for the right front wheel WB and the wheel brake BC for the left rear wheel WC.

In normal braking where there is no possibility of the wheels locking, the fluid pressure adjusting unit 12 configured as described above causes the master cylinder M and the wheel brakes BA to BD to communicate with each other while the wheel brakes BA to BD are isolated from the first and second reservoirs 18A and 18B. Specifically, the normally-open electromagnetic valves 15A to 15D are demagnetized and opened while the normally-closed electromagnetic valves 17A to 17D are demagnetized and closed. Hence, a brake fluid pressure outputted from the first output port 23A of the master cylinder M acts on the wheel brake BA for the left front wheel WA via the normally-open electromagnetic valve 15A and also acts on the wheel brake BD for the right rear wheel WD via the normally-open electromagnetic valve 15D. Moreover, a brake fluid pressure outputted from the second output port 23B of the master cylinder M acts on the wheel brake BB for the right front wheel WB via the normally-open electromagnetic valve 15B and also acts on the wheel brake BC for the left rear wheel WC via the normally-open electromagnetic valve 15C.

When any of the wheels almost locks during the braking, the fluid pressure adjusting unit 12 isolates the master cylinder M and the wheel brakes BA to BD from each other and also causes the wheel brakes BA to BD and the reservoirs 18A and 18B to communicate with each other at portions corresponding to the wheel in the almost-locking state. Specifically, a normally-open electromagnetic valve corresponding to the wheel in the almost-locking state among the normally-open electromagnetic valves 15A to 15D is magnetized and closed while a normally-closed electromagnetic valve corresponding to the wheel in the almost-locking state is magnetized and opened. Hence, part of the brake fluid pressure of the wheel in the almost-locking state is absorbed by the first reservoir 18A or the second reservoir 18B and the brake fluid pressure of the wheel in the almost-locking state is thereby decreased.

Moreover, when the brake fluid pressure is to be maintained constant, the fluid pressure adjusting unit 12 is set to a state where the wheel brakes BA to BD are isolated from the master cylinder M and the reservoirs 18A and 18B. Specifically, the normally-open electromagnetic valves 15A to 15D are magnetized and closed while the normally-closed electromagnetic valves 17A to 17D are demagnetized and closed. Furthermore, when the brake fluid pressure is to be increased, the normally-open electromagnetic valves 15A to 15D are demagnetized and opened while the normally-closed electromagnetic valves 17A to 17D are demagnetized and closed.

Efficient braking without the wheels locking can be achieved by controlling demagnetization and magnetization of the normally-open electromagnetic valves 15A to 15D and the normally-closed electromagnetic valves 17A to 17D as described above.

Meanwhile, during an anti-lock brake control as described above, the electric motor 20 rotationally operates and the first and second pumps 19A and 19B are driven by the operation of the electric motor 20. Accordingly, the brake fluid absorbed in the first and second reservoirs 18A and 18B is suctioned by the first and second pumps 19A and 19B and is then circulated to the first and second output fluid pressure passages 24A and 24B via the first and second dampers 21A and 21B. The brake fluid can be returned to the master cylinder M by this circulation of the brake fluid. Moreover, pulsation of discharge pressures of the first and second pumps 19A and 19B are suppressed by the actions of the first and second dampers 21A and 21B and the first and second orifices 22A and 22B. The operation feeling of the brake pedal 11 is thus not adversely affected by the circulation.

Figure 3:
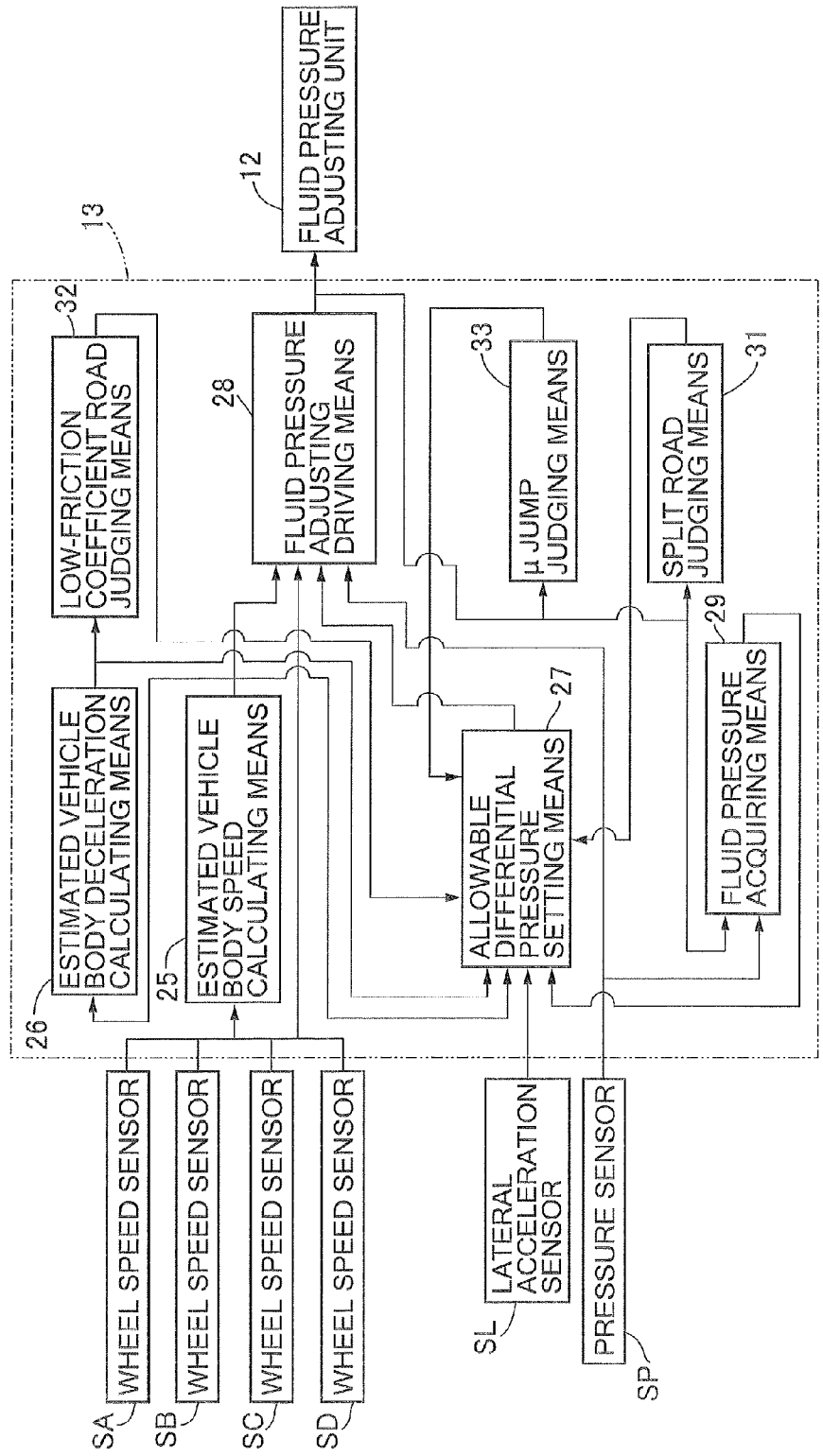
FIG. 3 is a block diagram showing a configuration of a vehicle brake fluid pressure control apparatus.

In FIG. 3, the fluid pressure control apparatus 13 controlling the operation of the fluid pressure adjusting unit 12 can execute, in addition to the anti-lock brake control, a differential pressure control in which the difference between the brake fluid pressures of the wheel brakes BA and BB for the left and right coaxial front wheels WA and WB and the difference between the brake fluid pressures of the wheel brakes BC and BD for the left and right coaxial rear wheels WC and WD are controlled to be within allowable differential pressures. In order to execute the differential pressure control, the fluid pressure control apparatus 13 includes: estimated vehicle body speed calculating means 25 for calculating an estimated vehicle body speed from wheel speeds obtained by the wheel speed sensors SA to SD; estimated vehicle body deceleration calculating means 26 for calculating an estimated vehicle body deceleration on the basis of the estimated vehicle body speed calculated by the estimated vehicle body speed calculating means 25; allowable differential pressure setting means 27 for setting allowable differential pressures allowable between the brake fluid pressures of the wheel brakes BA and BB for the left and right coaxial front wheels WA and WB and between the brake fluid pressures of the wheel brakes BC and BD for the left and right coaxial rear wheels WC and WD; fluid pressure adjusting driving means 28 for determining a control amount on the basis of the allowable differential pressures set by the allowable differential pressure setting means 27, an output fluid pressure of the master cylinder M detected by the pressure sensor SP, the wheel speeds obtained by the wheel speed sensors SA to SD, and the estimated vehicle body speed calculated by the estimated vehicle body speed calculating means 25 and for causing the fluid pressure adjusting unit 12 to operate; fluid pressure acquiring means 29 for acquiring a wheel brake fluid pressure of a wheel coaxial with and other than a wheel being a control target, a lock fluid pressure of the wheel brake of the wheel coaxial with and other than the wheel being the control target, and the lock fluid pressures of the wheel brakes BA and BB for the left and right front wheels WA and WB, on the basis of the output of the fluid pressure adjusting driving means 28 and the signal from the pressure sensor SP, the lock fluid pressures being fluid pressures at which the pressure decrease by the anti-lock brake control is started; split road judging means 31 for judging whether a road is a split road in which friction coefficients of contact road surfaces of the left and right wheels WA and WB and the left and right wheels WC and WD greatly differ from each other, on the basis of the output from the fluid pressure adjusting driving means 28; low-friction coefficient road judging means 32 for judging whether a road is a low-friction coefficient road in which the friction coefficient of the road surface is lower than a predetermined friction coefficient, on the basis of the estimated vehicle body deceleration obtained by the estimated vehicle body deceleration calculating means 26; and µ jump judging means 33 for judging whether it is a µ jump state in which a friction coefficient of the running road surface changes from a high friction coefficient to a lower friction coefficient side by a predetermined value or more, on the basis of the output of the fluid pressure adjusting driving means 28.

Figure 4:
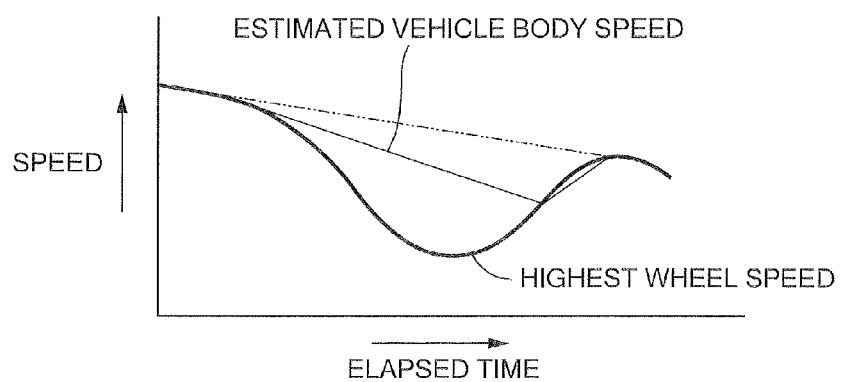
FIG. 4 is a diagram for explaining a calculation of estimated vehicle body speed.

The estimated vehicle body speed calculating means 25 calculates the estimated vehicle body speed on the basis of, for example, a highest wheel speed being the wheel speed with the greatest value among the wheel speeds obtained by the wheel speed sensors SA to SD. When the highest wheel speed changes as shown in FIG. 4, the estimated vehicle body speed calculating means 25 corrects the highest wheel speed by using predetermined acceleration and deceleration to obtain such an estimated vehicle speed that the largest acceleration and the largest deceleration are respectively the predetermined acceleration and deceleration. As shown by the chain line of FIG. 4, the estimated vehicle body deceleration calculating means 26 calculates the estimated vehicle body deceleration as an inclination of a straight line connecting peak values of the estimated vehicle body speed.

The fluid pressure acquiring means 29 acquires the wheel brake fluid pressure and the lock fluid pressure of the wheel coaxial with and other than the wheel being the control target, on the basis of the output fluid pressure of the master cylinder M common to the multiple wheel brakes BA to BD and drive electric currents of the electromagnetic valves forming part of the fluid pressure adjusting unit 12, i.e. the normally-open electromagnetic valves 15A to 15D and the normally-closed electromagnetic valves 17A to 17D. The output fluid pressure of the master cylinder M is inputted into the fluid pressure acquiring means 29 from the pressure sensor SP and signals representing the drive electric currents of the normally-open electromagnetic valves 15A to 15D and the normally-closed electromagnetic valves 17A to 17D are inputted into the fluid pressure acquiring means 29 from the fluid pressure adjusting driving means 28.

The allowable differential pressure setting means 27 sets each of the allowable differential pressures by selecting the largest one of a vehicle body speed component determined depending on the estimated vehicle body speed, a lateral acceleration component determined depending on the lateral acceleration, and a friction coefficient component determined depending on the friction coefficient of the running road surface. The estimated vehicle body speed obtained by the estimated vehicle body speed calculating means 25, the estimated vehicle body deceleration obtained by the estimated vehicle body deceleration calculating means 26, the lateral acceleration obtained by the lateral acceleration sensor SL, the lock fluid pressure obtained by the fluid pressure acquiring means 29, and the fluid pressure of the coaxial wheel obtained by the fluid pressure acquiring means 29 are inputted into the allowable differential pressure setting means 27.

Figure 5:
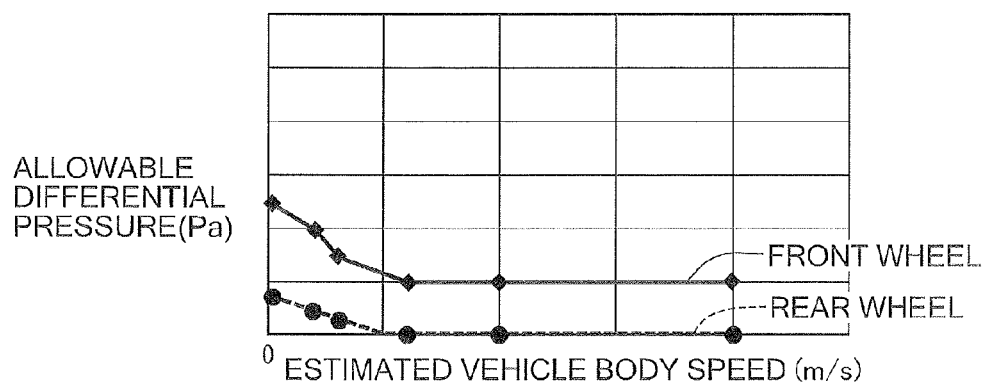
FIG. 5 is a map showing a relationship between an estimated vehicle body speed and an allowable differential pressure.
Figure 6:
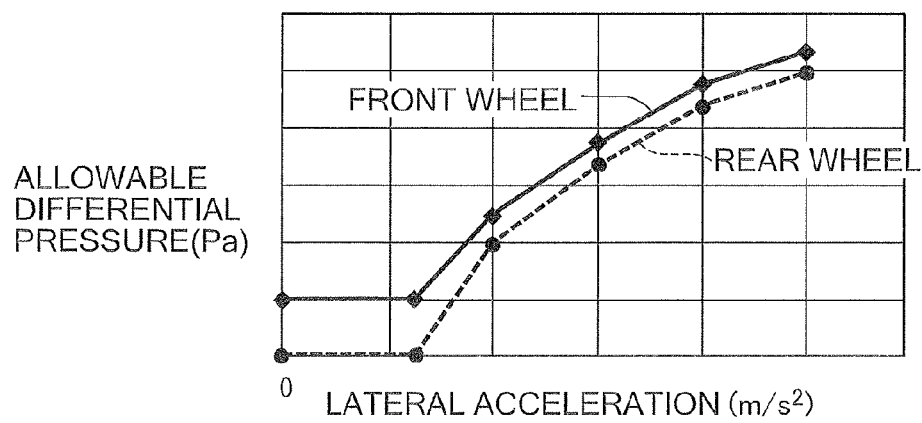
FIG. 6 is a map showing a relationship between a lateral acceleration and the allowable differential pressure.

The allowable differential pressure setting means 27 has a map in which the allowable differential pressures are set as shown in FIG. 5 depending on the estimated vehicle body speed on the basis of experiments, simulations, and the like for each of the pair of the front wheels and the pair of the rear wheels, the map being set as the vehicle body speed component determined depending on the estimated vehicle body speed calculated by the estimated vehicle body speed calculating means 25. The allowable differential pressure setting means 27 also has a map in which the allowable differential pressures are set as shown in FIG. 6 depending on the lateral acceleration on the basis of experiments, simulations, and the like for each of the pair of the front wheels and the pair of the rear wheels, the map being set as the lateral acceleration component determined depending on the lateral acceleration detected by the lateral acceleration sensor SL.

Figure 7:
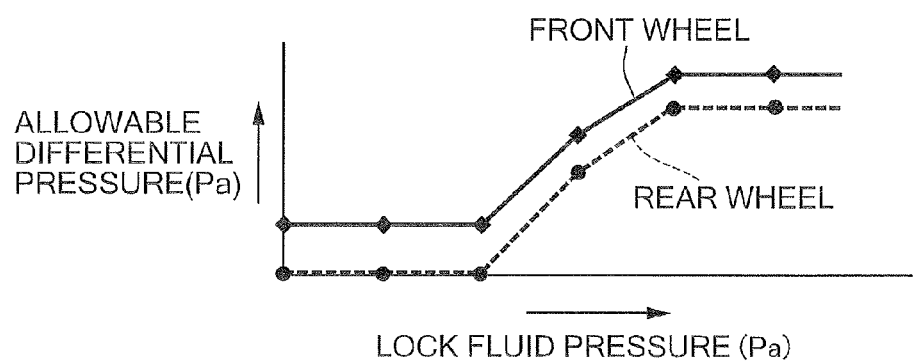
FIG. 7 is a map showing a relationship between a lock fluid pressure and the allowable differential pressure.
Figure 8:
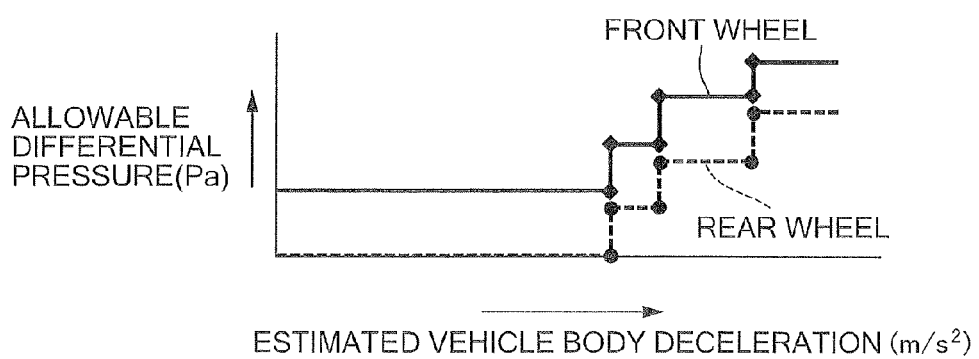
FIG. 8 is a map showing a relationship between an estimated vehicle body deceleration and the allowable differential pressure.

Moreover, the allowable differential pressure setting means 27 selects the value of the larger one of a lock fluid pressure component and an estimated vehicle body deceleration component as the friction coefficient component determined depending on the friction coefficient of the running road surface and uses it as the friction coefficient component. The allowable differential pressure setting means 27 has a map in which the allowable differential pressures are set as shown in FIG. 7 depending on the lock fluid pressure on the basis of experiments, simulations, and the like for each of the pair of the front wheels and the pair of the rear wheels, the map being set as the lock fluid pressure component. The allowable differential pressure setting means 27 also has a map in which the allowable differential pressures are set as shown in FIG. 8 depending on the estimated vehicle body deceleration on the basis of experiments, simulations, and the like for each of the pair of the front wheels and the pair of the rear wheels, the map being set as the estimated vehicle body deceleration component determined depending on the estimated vehicle body deceleration obtained by the estimated vehicle body deceleration calculating means 26. The allowable differential pressure setting means 27 sets high select values of the allowable differential pressures obtained from these maps as the allowable differential pressures matching a road surface friction coefficient.

Figure 9:
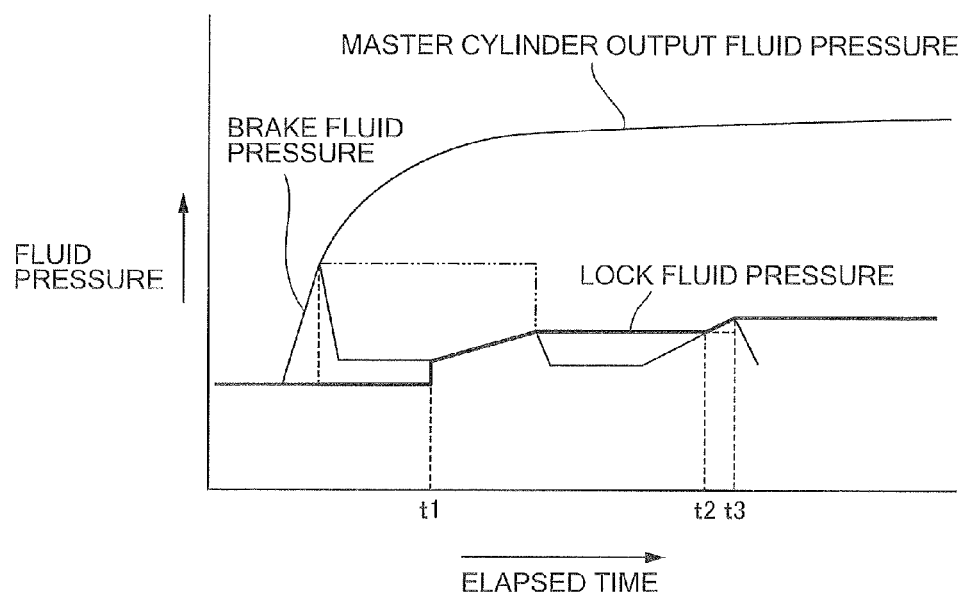
FIG. 9 is a graph showing an example of a brake fluid pressure of a coaxial wheel and the lock fluid pressure.

Incidentally, in the anti-lock brake control during full braking, as shown in FIG. 9, there is a possibility of the brake fluid pressure overshooting in a first cycle of the anti-lock brake control and, along with this, the lock fluid pressure overshooting as shown by the chain line. The fluid pressure acquiring means 29 thus starts acquiring the lock fluid pressure from a time t1 being a time at which the pressure increase in the first cycle of the anti-lock brake control is started. This enables the lock fluid pressure to be acquired accurately. Then the allowable differential pressure setting means 27 selects the value of the larger one of the lock fluid pressure obtained by the fluid pressure acquiring means 29 and the brake fluid pressure of the coaxial wheel. In a period between times t2 to t3 in which the brake fluid pressure of the coaxial wheel is larger than the lock fluid pressure, the allowable differential pressure setting means 27 uses the brake fluid pressure of the coaxial wheel as the lock fluid pressure.

Furthermore, since there is a possibility of the lock fluid pressure overshooting as described above in a period from the start of the anti-lock brake control to the time t1, the allowable differential pressure setting means 27 does not set the allowable differential pressures based on the lock fluid pressure during a period from the start of pressure decrease by the start of the anti-lock brake control to the start of pressure increase. In addition, the estimated vehicle body deceleration calculating means 26 cannot accurately calculate the estimated vehicle body deceleration used to set the allowable differential pressures matching the friction coefficient of the road surface, in an initial stage of the anti-lock brake control. Accordingly, the allowable differential pressure setting means 27 sets the allowable differential pressures based on the estimated vehicle body speed after a control cycle of decreasing, maintaining, and increasing the brake fluid pressure is repeated at least two times in the anti-lock brake control.

The split road judging means 31 judges that a road is the split road when an independent control using the allowable differential pressures is continuously executed for any of the left and right front wheels for a predetermined time or longer on the basis of the signals from the fluid pressure adjusting driving means 28 and also judges that the road is the split road when the brake fluid pressure of the wheel being the control target is higher than the lock fluid pressure of the wheel brake of the wheel coaxial with and other than the wheel being the control target by a predetermined value or more.

In other words, a state where the differential pressure between the wheel brakes BA and BB for the left and right front wheels is continuously occurring for the predetermined time or more can be estimated as the split road and the split road judging means 31 judges that the road is the split road in such a state.

When the wheel speeds of the left and right front wheels change as shown in FIG. 10A by running on the split road, the brake fluid pressure and the lock fluid pressure of one of the wheel brakes BA and BB for the left and right front wheels WA and WB on the high friction coefficient side and the brake fluid pressure and the lock fluid pressure on the low friction coefficient side change as shown in FIG. 10B. When there is a large differential pressure between the lock fluid pressure on the high friction coefficient side and the lock fluid pressure on the low friction coefficient side and the brake fluid pressure of the wheel being the control target is higher than the lock fluid pressure of the wheel brake of the wheel coaxial with and other than the wheel being the control target by the predetermined value or more, it can be judged that the road is the split road.

The low-friction coefficient road judging means 32 judges that a road is the low-friction coefficient road when the estimated vehicle body deceleration calculated by the estimated vehicle body deceleration calculating means 26 is lower than a defined value and also judges that the road is the low-friction coefficient road when the lock fluid pressure of any of the wheel brakes BA and BB for the left and right front wheels WA and WB is smaller than a predetermined value.

The μ jump judging means 33 judges that it is the μ jump state when a pressure decrease amount in the anti-lock brake control of any of the wheel brakes BA and BB for the left and right front wheels WA and WB increases by a predetermined amount or more from the pressure decrease amount in the previous cycle.

The application of the allowable differential pressures matching the road surface friction coefficient is prohibited when the split road judging means 31 judges that the road is the split road, when the low friction coefficient path judging means 32 judges that the road is the low-friction coefficient road on the basis of the estimated vehicle body deceleration, or when the μ jump judging means 33 judges that it is the μ jump state. In the embodiment, the allowable differential pressure setting means 27 stops the setting of the allowable differential pressures matching the road surface friction coefficient and set each allowable differential pressure by selecting the larger one of the vehicle body speed component determined depending on the estimated vehicle speed and the lateral acceleration component determined depending on the lateral acceleration.

Moreover, the application of the allowable differential pressures matching the road surface friction coefficients is prohibited in at least the wheel brakes BC and BD for the left and right rear wheels WC and WD when the low-friction coefficient road judging means 32 judges that the road is the low-friction coefficient road on the basis of the lock fluid pressures of the wheel brakes BA and BB for the left and right front wheels WA and WB.

Furthermore, the application of the allowable differential pressures matching the road surface friction coefficients is prohibited in at least the wheel brakes BC and BD for the rear wheels WC and WD when the lock fluid pressure of any of the wheel brakes BA and BB for the left and right front wheels WA and WB, which are acquired by the fluid pressure acquiring means 29, is equal to or lower than the predetermined value from which the road can be judged to have a low friction coefficient.

Next, operations of the embodiment are described. The allowable differential pressure setting means 27 sets each allowable differential pressure by selecting the largest one of the vehicle speed component determined depending on the estimated vehicle body speed, the lateral acceleration component determined depending on the lateral acceleration, and the friction coefficient component determined depending on the friction coefficient of the running road surface. The allowable differential pressure setting means 27 determines each allowable differential pressure matching the road surface friction coefficient by selecting a value of the larger one of the estimated vehicle body deceleration component and the lock fluid pressure component. The allowable differential pressure setting means 27 sets each allowable differential pressure matching the road surface friction coefficient on the basis of the estimated vehicle body deceleration calculated by the estimated vehicle body deceleration calculating means 26 as the estimated vehicle body deceleration component and sets the allowable differential pressure matching the road surface friction coefficient on the basis of the lock fluid pressure of the coaxial wheel acquired by the fluid pressure acquiring means 29 as the lock fluid pressure component.

Accordingly, when the allowable differential pressures matching the road surface friction coefficient are set based on the estimated vehicle body deceleration, it is possible to accurately judge whether the road surface has a high friction coefficient or a low friction coefficient and to set larger allowable fluid differential pressures between the brake fluid pressures of the wheel brakes BA and BB for the left and right coaxial front wheels WA and WB and between the brake fluid pressures of the wheel brakes BC and BD for the left and right rear wheels WC and WD on the road surface having the high friction coefficient which is a stable running road surface, compared to the conventional case in which the brake fluid pressure of the wheel coaxial with the wheel being the control target is used as the component corresponding to the friction coefficient of the road surface. Accordingly, the control efficiency of a left-right independent control can be improved.

Moreover, when each allowable differential pressure matching the road surface friction coefficient is set based on the lock fluid pressure of the coaxial wheel, fluctuation in the allowable differential pressure can be suppressed in such a way that hunting caused by the effects of fluid pressure change due to increase and decrease in the brake fluid pressure in the anti-lock brake control is prevented from occurring. Accordingly, the allowable differential pressure stably matching the friction coefficient of the road surface can be set.

Furthermore, the estimated vehicle body deceleration calculating means 26 calculates the estimated vehicle body deceleration on the basis of the estimated vehicle body speed calculated by the estimated vehicle body speed calculating means 25 from the wheel speeds detected by the wheel speed sensors SA, SB, SC, and SD respectively of the front wheels WA and WB and the rear wheels WC and WD. Accordingly, the estimated vehicle body deceleration can be accurately calculated without using other sensors such as an acceleration sensor.

In addition, the allowable differential pressure setting means 27 has the map in which the allowable differential pressures are set in advance for the estimated vehicle body speed, and sets the allowable differential pressures matching the road surface friction coefficient on the basis of the map. Accordingly, each allowable differential pressure can be easily set to a value suitable for the friction coefficient of the road surface by using the map set based on experiments, simulations, and the like.

Moreover, the allowable differential pressure setting means 27 sets the allowable differential pressures based on the estimated vehicle body deceleration after the control cycle of decreasing, maintaining, and increasing the brake fluid pressure is repeated at least two times in the anti-lock brake control for preventing the wheels from being locked. Accordingly, the allowable differential pressure setting means 27 sets the allowable differential pressures based on the estimated vehicle body deceleration only in the state where the vehicle body deceleration can be accurately calculated. Hence, allowable differential pressures with high reliability can be obtained.

Moreover, the allowable differential pressure setting means 27 sets a value of the larger one of the allowable differential pressure based on the lock fluid pressure of the wheel brake of the wheel coaxial with and other than the wheel being the control target and the allowable differential pressure set based on the estimated vehicle body deceleration as each of the allowable differential pressures matching the road surface friction coefficient, the lock fluid pressure being a fluid pressure at which the pressure decrease by the anti-lock brake control is started. Accordingly, the allowable differential pressures more accurately matching the friction coefficient of the running road surface can be obtained.

Furthermore, the fluid pressure acquiring means 29 calculates the lock fluid pressure on the basis of the output fluid pressure of the master cylinder M common to the multiple wheel brakes BA, BB, BC, and BD and the drive electric currents of the normally-open electromagnetic valves 15A, 15B, 15C, and 15D and the normally-closed electromagnetic valves 17A, 17B, 17C, and 17D which form part of the fluid pressure adjusting unit 12. Accordingly, the lock fluid pressure can be appropriately acquired without using sensors or the like.

In addition, the allowable differential pressure setting means 27 has the map in which the allowable differential pressures are set in advance for the lock fluid pressure, and sets the allowable differential pressure matching the road surface friction coefficient on the basis of the map. Accordingly, each allowable differential pressure can be easily set to a value suitable for the friction coefficient of the road surface by using the map set based on experiments, simulations, and the like.

The fluid pressure acquiring means 29 acquires the fluid pressure of the wheel brake of the wheel coaxial with and other than the wheel being the control target and the allowable differential pressure setting means 27 sets each allowable differential pressure matching the road surface friction coefficient on the basis of the larger one of the lock fluid pressure acquired by the fluid pressure acquiring means 29 and the fluid pressure of the wheel brake of the wheel coaxial with and other than the wheel being the control target. Accordingly, even when the brake fluid pressure is increased, this increase can be immediately reflected in the setting of the allowable differential pressure. Hence, the allowable differential pressure matching the road surface friction coefficient can be set more accurately.

In addition, the allowable differential pressure setting means 27 sets the allowable differential pressures based on the lock fluid pressure in a period except for the period from the start of the pressure decrease in the start of the anti-lock brake control to the start of the pressure increase. The allowable differential pressures based on the lock fluid pressure are thus not set in a period in which the lock fluid pressure may overshoot due to full braking. The reliability can be thereby improved.

Incidentally, the split road judging means 31 judges whether the road is the split road in which the friction coefficients of the contact road surfaces of the right and left wheels differ greatly from each other and the low-friction coefficient road judging means 32 judges whether the road is the low-friction coefficient road in which the friction coefficient of the road surface is lower than the predetermined friction coefficient. When the judgment result of the split road judging means 31 is the split road or when the judgment result of the low-friction coefficient road judging means 32 is the low-friction coefficient road, the application of the allowable differential pressures matching the road surface friction coefficient is prohibited. Accordingly, when the vehicle is running on a road which is not the split road or the low-friction coefficient road and the running state of the vehicle is stable, the allowable differential pressure between the brake fluid pressures in each of the pair of the wheel brakes BA and BB of the left and right coaxial front wheels WA and WB and the pair of the wheel brakes BC and BD of the left and right coaxial rear wheels WC and WD is set to match the road surface friction coefficient and the appropriate allowable differential pressure matching the road surface state can be thereby set.

The split road judging means 31 judges that the road is the split road when the independent control using the allowable differential pressures is executed continuously for any of the left and right wheels for the predetermined time or more and judges that the road is the split road when the brake fluid pressure of the wheel being the control target is higher than the lock fluid pressure of the wheel brake of the wheel coaxial with and other than the wheel being the control target by the predetermined value or more, the lock fluid pressure being the fluid pressure at which the pressure decrease by the anti-lock brake control is started. This makes it possible to appropriately make the judgment of the split road and stop the setting of the allowable differential pressures matching the road surface friction coefficient while the vehicle is running on the split road. The vehicle behavior stability can be thereby secured.

The low-friction coefficient road judging means 32 judges that the road is the low-friction coefficient road when the estimated vehicle body deceleration calculated by the estimated vehicle body deceleration calculating means 26 is lower than the defined value. This makes it possible to appropriately make the judgment of the low-friction coefficient road and the vehicle behavior stability can be thereby secured.

Moreover, the µ jump judging means 33 judges whether it is the µ jump state in which the friction coefficient of the running road surface changes from a high friction coefficient to a lower friction coefficient side by a predetermined value or more. When the judgment result of the µ jump judging means 33 is the µ jump state, the allowable differential pressure setting means 27 prohibits application of the allowable differential pressures matching the road surface friction coefficient. Accordingly, it is possible to prevent deterioration in the vehicle behavior stability which is caused by setting the allowable differential pressures matching the road surface friction coefficient in the µ jump state.

The fluid pressure acquiring means 29 acquires the lock fluid pressures of the wheel brakes BA and BB of the front wheels WA and WB, the lock fluid pressures being fluid pressures at which the anti-lock brake control is started. Application of the allowable differential pressures matching the road surface friction coefficient is prohibited when any of the lock fluid pressures of the wheel brakes BA and BB of the front wheels WA and WB, which are acquired by the fluid pressure acquiring means 29, is equal to or lower than the predetermined value from which the road can be judged to have a low friction coefficient. Accordingly, the allowable differential pressures matching the road surface state can be appropriately set by not setting the allowable differential pressures matching the road surface friction coefficient on a road surface having a low friction coefficient.

Moreover, the application of the allowable differential pressures matching the road surface friction coefficient is prohibited when any one of the lock fluid pressures of the wheel brakes BA and BB of the left and right front wheels WA and WB, which are acquired by the fluid pressure acquiring means 29, is equal to or lower than the predetermined value. Accordingly, the configuration can be such that the allowable differential pressures matching the road surface friction coefficient are not applied unless both of the contact road surfaces of the left and right front wheels WA and WB have the high friction coefficient and that the setting of the allowable differential pressures matching the friction coefficient is allowed only when the road surface has a high friction coefficient and is not the split road.

Moreover, the allowable differential pressure setting means 27 prohibits the application of the allowable differential pressures matching the road surface friction coefficient at least for the wheel brakes BC and BD of the rear wheels WC and WD, on the basis of the lock fluid pressures of the wheel brakes BA and BB of the front wheels WA and WB. Hence, the allowing and prohibiting of the differential pressure control using the allowable differential pressure matching the road surface friction coefficient at least for the wheel brakes BC and BD of the left and right rear wheels WC and WD are determined based on the lock fluid pressures of the wheel brakes BA and BB for the front wheels WA and WB and the allowing and prohibiting of the differential pressure control particularly for the rear wheels WC and WD can be performed surely and quickly.

Although an embodiment of the present invention has been described above, the present invention is not limited to the embodiment described above. Various design changes can be made without departing from the gist of the present invention.

What is claimed is:

1. A vehicle brake fluid pressure control apparatus including:
   a fluid pressure adjusting unit capable of performing adjustment of individually increasing and decreasing brake fluid pressures acting respectively on wheel brakes for front wheels and wheel brakes for rear wheels so as to prevent the front wheels and the rear wheels from being locked during braking; and allowable differential pressure setting means for setting allowable differential pressures allowable between the brake fluid pressures of the wheel brakes for the left and right coaxial front wheels and between the brake fluid pressures of the wheel brakes for the left and right coaxial rear wheels, the operation of the fluid pressure adjusting unit being controlled in such a way that each of the differential pressures between the brake fluid pressures of the wheel brakes for the left and right coaxial front wheels and between the brake fluid pressures of the wheel brakes for the left and right coaxial rear wheels is equal to or lower than a corresponding one of the allowable differential pressures set by the allowable differential pressure setting means, wherein the vehicle brake fluid pressure control apparatus comprises lock fluid pressure acquiring means for acquiring a lock fluid pressure of a wheel brake of a secondary wheel coaxial with and other than a wheel which is selected as a primary control target, the lock fluid pressure being a fluid pressure at which pressure decrease by an anti-lock brake control is started, the lock fluid pressure acquiring means calculating the lock fluid pressure on the basis of an output fluid pressure of a master cylinder common to the wheel brakes and drive electric currents of electromagnetic valves forming part of the fluid pressure adjusting unit, and wherein the allowable differential pressure setting means sets the allowable differential pressures to correspond to an estimated road surface friction coefficient which is calculated on the basis of at least the lock fluid pressure obtained by the lock fluid pressure acquiring means.

2. The vehicle brake fluid pressure control apparatus according to claim 1, wherein the allowable differential pressure setting means has a stored map in which the allowable differential pressures are set in advance for the lock fluid pressure, and wherein the allowable differential pressure setting means sets the allowable differential pressures corresponding to the road surface friction coefficient on the basis of the stored map.

3. The vehicle brake fluid pressure control apparatus according to claim 1, wherein fluid pressure acquiring means is capable of acquiring the fluid pressure of the wheel brake of the secondary wheel, and the allowable differential pressure setting means sets each of the allowable differential pressures matching the road surface friction coefficient on the basis of the larger one of the fluid pressure of the secondary wheel and the lock fluid pressure acquired by the lock fluid pressure acquiring means.

4. The vehicle brake fluid pressure control apparatus according to claim 1, wherein the allowable differential pressure setting means sets the allowable differential pressures based on the lock fluid pressure in a period except for a period from a start of pressure decrease in a start of the anti-lock brake control to a start of pressure increase.

5. The vehicle brake fluid pressure control apparatus according to claim 1, further comprising estimated vehicle body deceleration calculating means for calculating an estimated vehicle body deceleration, wherein the allowable differential pressure setting means is operable to set an allowable differential pressure based on the estimated vehicle body deceleration, and selects an applicable allowable differential pressure matching the estimated road surface friction coefficient as a value of the larger one of the allowable differential pressure set based on the estimated vehicle body deceleration and the allowable differential pressure set based on the lock fluid pressure.

6. A vehicle brake fluid pressure control apparatus comprising:

a fluid pressure adjusting unit capable of performing adjustment of individually increasing and decreasing brake fluid pressures acting respectively on wheel brakes for front wheels and wheel brakes for rear wheels so as to prevent the front wheels and the rear wheels from being locked during braking; and allowable differential pressure setting means for setting allowable differential pressures allowable between the brake fluid pressures of the wheel brakes for the left and right coaxial front wheels and between the brake fluid pressures of the wheel brakes for the left and right coaxial rear wheels, the operation of the fluid pressure adjusting unit being controlled in such a way that each of the differential pressures between the brake fluid pressures of the wheel brakes for the left and right coaxial front wheels and between the brake fluid pressures of the wheel brakes for the left and right coaxial rear wheels is equal to or lower than a corresponding one of the allowable differential pressures set by the allowable differential pressure setting means, wherein the vehicle brake fluid pressure control apparatus comprises lock fluid pressure acquiring means for acquiring a lock fluid pressure of a wheel brake of a secondary wheel coaxial with and other than a wheel which is selected as a primary control target, the lock fluid pressure being a fluid pressure at which pressure decrease by an anti-lock brake control is started, and wherein the allowable differential pressure setting means sets the allowable differential pressures to correspond to an estimated road surface friction coefficient which is calculated on the basis of at least the lock fluid pressure obtained by the lock fluid pressure acquiring means, the vehicle brake fluid pressure control apparatus further comprising:

split road judging means for judging whether a road is a split road in which fiction coefficients of contact road surfaces of left and right wheels differ greatly from each other; and low-friction coefficient road judging means for judging whether a road is a low-friction coefficient road in which a friction coefficient of a road surface is lower than a predetermined friction coefficient, wherein application of the allowable differential pressures matching the road surface friction coefficient is prohibited when a judgment result of the split road judging means is the split road or when a judgment result of the low-friction coefficient road judging means is the low-friction coefficient road.

7. The vehicle brake fluid pressure control apparatus according to claim 6, comprising estimated vehicle body deceleration calculating means for calculating an estimated vehicle body deceleration of a vehicle, wherein the allowable differential pressure setting means is operable to set an allowable differential pressure based on the estimated vehicle body deceleration, and selects an applicable allowable differential pressure matching the estimated road surface friction coefficient as a value of the larger one of the allowable differential pressure set based on the estimated vehicle body deceleration and the allowable differential pressure set based on the lock fluid pressure.

8. The vehicle brake fluid pressure control apparatus according to claim 7, wherein the split road judging means judges that the road is the split road when an independent control using the allowable differential pressure is continuously executed for a predetermined time in any of the wheel brakes for the left and right front wheels.

9. The vehicle brake fluid pressure control apparatus according to claim 6, wherein the split road judging means judges that the road is the split road when an independent control using the allowable differential pressure is continuously executed for a predetermined time or more in any of the wheel brakes for the left and right front wheels.

10. The vehicle brake fluid pressure control apparatus according to claim 6, wherein the split road judging means judges that the road is the split road when the brake fluid pressure of the wheel being the control target is higher than the lock fluid pressure of the wheel brake of the wheel coaxial with and other than the wheel being the control target by a predetermined value or more.

11. The vehicle brake fluid pressure control apparatus according to claim 6, wherein the low-friction coefficient road judging means judges that the road is the low-friction coefficient road when a change amount of the estimated vehicle body deceleration calculated by the estimated vehicle body deceleration calculating means is lower than a defined value.

12. The vehicle brake fluid pressure control apparatus according to claim 6, further comprising $\mu$ jump judging means for judging whether it is a $\mu$ jump state in which a friction coefficient of a running road surface changes from a high friction coefficient to a lower friction coefficient side by a predetermined value or more, wherein the allowable differential pressure setting means stops setting of the allowable differential pressures matching the road surface friction coefficient when a judgment result of the $\mu$ jump judging means is the $\mu$ jump state.

\* \* \* \* \*